United States Patent Office 3,716,919
Patented Feb. 20, 1973

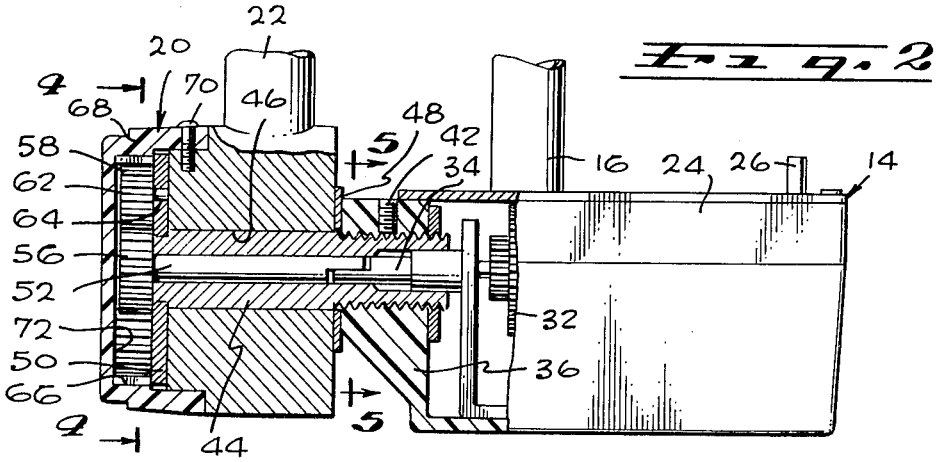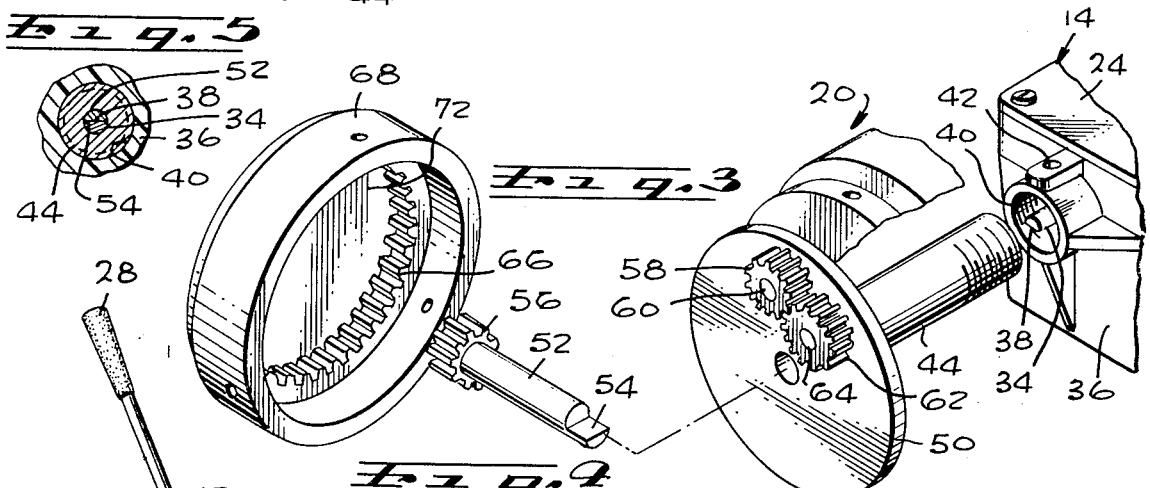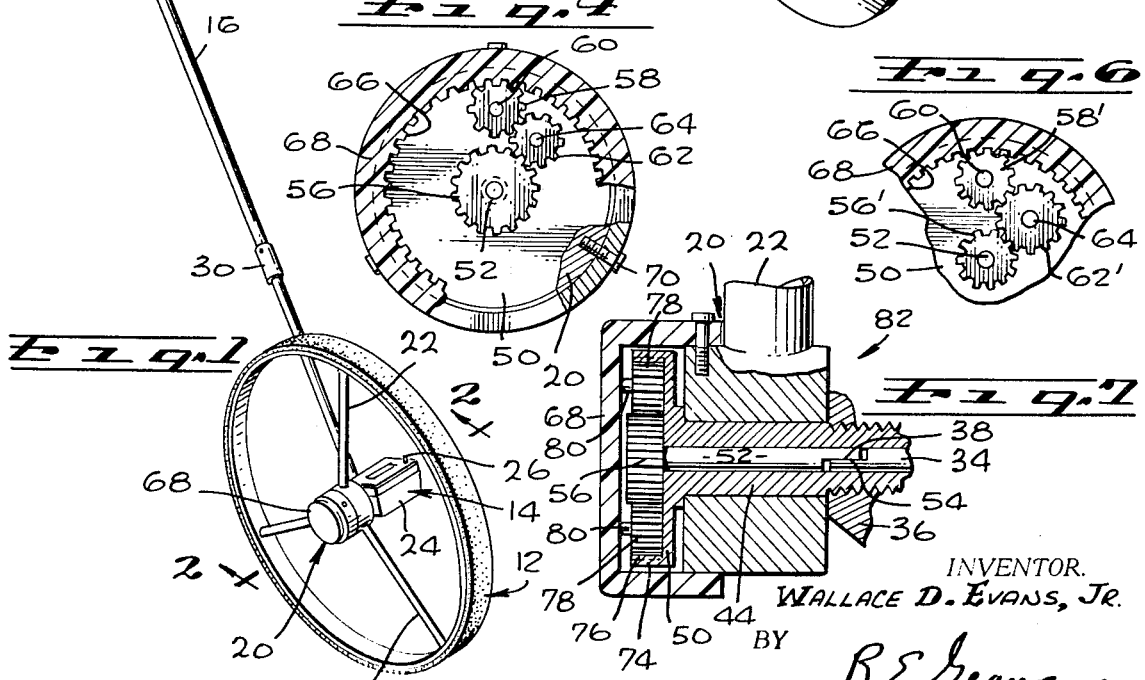

3,716,919
MEASURING WHEEL DEVICE
Wallace D. Evans, Jr., Los Angeles, Calif., assignor to Rolatape Corporation, Santa Monica, Calif.
Filed Feb. 16, 1971, Ser. No. 115,494
Int. Cl. G01b 3/12
U.S. Cl. 33—141 E
9 Claims

ABSTRACT OF THE DISCLOSURE

A measuring wheel device including a gearing assembly to transmit the wheel movement to a counter mechanism, the gearing assembly comprising an idler gear located between the first and second drive gears, the gearing assembly being located within a chamber formed within the wheel hub cover, the size of the gears within the gearing assembly being capable of being varied to establish different ratios between the wheel and the counter mechanism.

BACKGROUND OF THE INVENTION

The field of this invention relates to measuring instruments of the wheel type for taking lineal measurements, and in particular relates to novel and useful improvements in a measurnig wheel therefor.

It has been common to employ the use of a measuring wheel to measure ground measurements. Primarily, such measuring wheels have been used in agriculture for the determining of acreage and by contractors in the laying out of roads and highways. The operator locates the counter mechanism associated with the measuring wheel at zero, and then moves the measuring wheel along the ground from one point to another point. The distance that the wheel has moved is then denoted by the counter mechanism.

Wheel measuring devices must employ some type of a counter mechanism to measure the rotational movement of the measuring wheel. Normally, the resolution of measurement is in feet and inches. However, the resolution may be in yards, in feet, in tenths of feet, rods, or any other increment of measurement.

The counter mechanism is mounted adjacent the hub of the wheel and extends axially therefrom. The handle of the device, which is to facilitate movement of the measuring wheel, is normally secured to the counter mechanism, thereby permitting complete freedom of movement of the measuring wheel.

Such measuring wheel devices have in the past been designed primarily for use in the outdoor environment. The reason for this being that measuring wheel devices are specifically designed to measure large distances, such large distances not being normally available in an indoors environment. However, it has been common within recent years for a measuring wheel to be used indoors by building contractors, real estate appraisers, insurance agents, etc.

In the manufacturing of such measuring wheel devices the size of the measuring wheels may be identical the only difference being what increment or type of measurement is being measured. For example, a real estate appraiser may select a measuring wheel which is to measure in feet and inches. A farmer may select the same measuring wheel device but desires to measure in rods. A building contractor may also select the same measuring wheel but desire it to read in feet and tenths of feet.

Previously, in the manufacturing of such wheels it has been quite difficult to design a measuring wheel device to be readily adaptable to measure in the different resolutions. As a result, such devices of the prior art have been of complex construction, increasing the manufacturing costs and therefore increasing the selling price of the finished product. Further, the maintaining of a substantial inventory backlog has not been particularly desirable. The reason for not maintaining a backlog has been that a measuring wheel device designed for a particular resolution could not be easily modified to adapt to another resolution. There may be a sporadic demand for the use of measuring wheel devices which measure in feet and tenths of feet and then this demand might shift to a measuring wheel which measures in feet and inches.

It would be desirable to design a measuring wheel device which could be readily modified to be adaptable to different resolutions and also be of relatively simple construction comprising a relatively few number of parts.

SUMMARY OF THE INVENTION

The measuring wheel device of this invention is to include a measuring wheel, an associated counter mechanism, and a handle. The handle is to be connected to the counter mechanism. It is to be used by the operator to guide the measuring wheel in a particular direction between two points to be measured. The counter mechanism is to include indicia which is capable of being interpreted by the operator as being the distance between the spaced apart points upon the surface to be measured. The counter mechanism is operated through a drive shaft with a first drive gear being connected to the drive shaft. The first drive gear is to be in abutting relationship with a sleeve plate. An idler gear is to be rotatably mounted upon the sleeve plate and operatively connected to the first drive gear. The second drive gear is to be rotatably mounted upon the sleeve plate with the second drive gear being operatively connected to the idler gear and also to a ring gear. The ring gear is internally located within the wheel hub cover. The wheel hub cover when secured into position with respect to the wheel hub automatically maintains the position of the gearing assembly and prevents accidental dislodgment therefrom. By varying the size of the drive gears and the idler gear, different ratios between the wheel and the counter mechanism can be employed with the different ratios being adaptable to measure in different resolutions.

BRIEF DESCRIPTION OF THE DRAWING

FIG. 1 is an overall isometric view of the measuring wheel device of this invention;

FIG. 2 is a cross sectional view taken along line 2—2 of FIG. 1 showing the novel connection of this invention between the measuring wheel and the counter mechanism;

FIG. 3 is an exploded isometric view showing the different elements employed to effect the connection between the measuring wheel and the counter mechanism;

FIG. 4 is a cross sectional view taken along line 4—4 of FIG. 2 showing in more detail the gearing assembly employed within the invention;

FIG. 5 is a cross sectional view taken along line 5—5 of FIG. 2 showing in more detail the counter mechanism driving shaft employed within this invention;

FIG. 6 is a view similar to FIG. 4 but showing a different gearing assembly employed for a different counter resolution; and FIG. 7 is a cross sectional view similar to FIG. 2 of a second embodiment of the gearing assembly employed within this invention.

DETAILED DESCRIPTION OF THE SHOWN EMBODIMENT

Referring particularly to the FIG. 1 of the drawing there is shown the measuring wheel device 10 of this invention having a measuring wheel 12, a counter mechanism 14, and a handle 16. The measuring wheel 12 is formed into an outer diameter surface 18 and a hub 20.

Spokes 22 extend radially from the hub 20 and connect to the measuring wheel surface 18.

Upon the surface 18 is to be located a non-metallic frictional material such as neoprene rubber or the like. Such material facilitates frictional movement of the measuring wheel 12 along the surface to be measured. The counter mechanism 14 is located within a housing 24 and is to form no specific part of this invention and is deemed to be conventional. Such counter mechanisms are well known and are adapted to count the revolutions of the measuring wheel with respect to the surface being measured. Such counting of revolutions can be in numerous types of incremental measurements such as inches and feet, feet and tenths of feet, rods, etc.

A reset button 26 is provided upon the housing 24 to permit reseting of the counter mechanism back to a zero starting position prior to effecting a measurement. Handle 16 is composed of grasping portion 28 and two elements which are telescopingly connected together through a clamp 30. However, handle 16 could be formed in a single element or in three or more elements. The handle 16 is attached to the housing 24 of the counter mechanism 14 by means of an attaching bracket (not shown). A fastener (not shown) cooperates with the attaching bracket to fixedly secure the handle 16 within the attaching bracket.

It is to be noted that the handle 16 is secured to the housing 24 directly adjacent the measuring wheel 12. The reason for this is that it is desired that the overall center of gravity of the entire apparatus 10 be located as nearly as possible in alignment with the center of the measuring wheel 12. If the location of the center of gravity is not so established, a natural imbalance occurs which produces a torque during use, tending to move the wheel away from its intended path. Such a torque tends to create wheel wobble which causes inaccuracy of measurement.

The counter mechanism 14 includes a counter 32 fixedly positioned within the housing 24. The counter 32 is caused to be rotated through a first drive shaft 34. The first drive shaft 34 passes through an end plate 36 which closes off the housing 24. The first drive shaft 34 and its free end thereof includes a flattened area 38, the purpose of which will be described further on in this specification. The first drive shaft 34 extends through the threaded aperture 40 of the end plate 36, the purpose of aperture 40 will also be described further on in the specification. A set screw 42 is threadably located within the end plate 36, the function of which will also be described further on in this specification.

A hollow sleeve 44 is adapted to pass through aperture 46 within the hub 20 and be threadably secured within aperture 40. A washer 48 is located between the end plate 36 and the hub 20. Washer 48 functions as a sealing element and a spacer between hub 28 and end plate 36. The free end of the sleeve 44 terminates in a sleeve plate 50. The set screw 42 is to firmly retain the hollow sleeve 44 within the end plate 36.

A second drive shaft 52 is rotatably mounted within the sleeve 44 and includes a flattened area 54 which is to matingly cooperate with the flattened area 38 of the first drive shaft 34. The free end of the second drive shaft 52 is connected to a first drive gear 56. The inner surface of the first drive gear 56 is to be rotatable with respect to the surface of the sleeve plate 50.

Adjacent the periphery of the sleeve plate 50 and also rotatable therewith is a second drive gear 58. Second drive gear 58 is rotatably mounted with respect to the sleeve plate 50 by means of a stub shaft 60.

Operatively connected to both the first drive gear 56 and the second drive gear 58 is an idler gear 62. The idler gear 62 is also rotatably mounted upon the sleeve plate 50 by means of a stub shaft 64.

The second drive gear 58 is to be operatively connected to a ring gear 66. Ring gear 66 is internally located within cover 68. Cover 68 is adapted to be fixedly secured to the hub 20 by means of a screw fastener 70. With the cover so located, a chamber 72 is formed between the forward end of the cover 68 and the sleeve plate 50.

The operation of the apparatus 10 of this invention is as follows: It is assumed that the handle 16 is in the compact position. The operator then merely releases the clamp 30 and effects extension of the handle 16 to the desired length and then retightens clamp 30. The operator then actuates the reset button 26 to set the counter 32 of the counter mechanism 14 at zero. The operator then proceeds to the starting point and begins moving the surface 18 of the measuring wheel 12 upon the surface to be measured between the two points. It is to be understood that the points of contact of the surface 18 are to be located upon the points of the surface to be measured. It is not necessary for the operator to effect walking as the apparatus 10 of this invention may be employed to measure the height of vertical walls or other similar vertical or substantially vertical structures. Upon the operator reaching the desired distance on the surface to be measured, the operator only need to effect reading of the counter 32 of the counter mechanism 14, thereby denoting an accurate measurement of the desired distance.

As the measuring wheel 12 is rotated, the ring gear 66 effects rotation of the second drive gear 58. The second drive gear 58 also effects rotation of the idler gear 62 through which the first drive gear 56 is rotated. The primary function of the idler gear 62 is to effect rotation of the first drive gear 56 in the same direction as the second drive gear 58. This is necessary to rotate the counter 32 in the same direction as the rotation of the wheel 12. The first drive gear 56, through the second drive shaft 52 and the first drive shaft 34, effects operation of the counter 32 of the counter mechanism 14.

Referring particularly to FIG. 4 of the drawing, it is shown that the second drive gear 58 and the idler gear 62 are approximately the same size and have the same number of teeth. It also is shown that the first drive gear 56 is larger in size and has a greater number of teeth than each of the gears 58 or 62. With this particular arrangement, a particular type of resolution can be obtained such as feet and inches.

Referring particularly to FIG. 6 of the drawing the gears 56', 58' and 62' are shown to be of different sizes and have the different number of teeth than the gears depicted in FIG. 4. In comparing FIG. 6 with FIG. 4, gears 56' and 58' are shown to be substantially smaller than their counterparts while idler gear 62' is substantially larger. As a result, a different rotational ratio can be obtained using the gearing assembly of FIG. 6 than that of FIG. 4. The gearing assembly of FIG. 6 may be employed to achieve a resolution such as rods and tenths of rods, or yards and feet.

It is to be understood that numerous other gear sizes could readily be employed within the scope of this invention. Actually, by selecting the sizes of the gearing assembly, an infinite number of ratios can be achieved between the measuring wheel surface 18 and the counter 32. It is further to be understood that such selection of the gearing assembly is in view of the diameter of the measuring wheel 12. For instance, if the diameter of the measuring wheel 12 is increased or decreased, to achieve the same resolution, a change in the gearing assembly will also be necessary. Also, the counter mechanism could be located further up on the handle 16 and not in axial alignment with shaft 52. If such were the case, a right angle drive could be employed from the counter 32 to the shaft 52. Such a right angle drive is common and could employ a worm and bevel gear arrangement.

A second embodiment 82 of a gearing assembly is shown in FIG. 7 of the drawing. Like numerals are employed to refer to like elements of the first embodiment shown in FIG. 2. The difference in structure relates to the forming of an annular collar 74 about the periphery of the sleeve plate 50. A ring gear 76 is formed internally of the collar 74. Planetary gears 78 are to be operatively connected to the ring gear 76. Each of the planetary gears 78 are rotatively supported upon a shaft 80. Each of the shafts 80 are fixedly secured to the cover 68. The cover 68 is secured to the hub 20.

The operation of the second embodiment 82 is as follows: Clockwise movement of the cover 68 (also wheel 12) causes counterclockwise rotation of the planetary gears 78 about ring gear 76. This counterclockwise rotational movement of the gears 78 results in clockwise rotation of the first drive gear 56. Therefore, the counter drive shaft 34 is driven in the same direction as the rotation of the wheel 12.

What is claimed is:

1. A measuring wheel device comprising:
   a measuring wheel having a rim portion and a hub portion, said rim portion being adapted to come into contact with a surface to be measured, said hub portion having a central opening therein;
   a counter mechanism being adapted to record the rotational movement of said wheel, said counter mechanism being operable by a drive shaft assembly;
   said drive shaft assembly extending through said central opening; and
   a first drive gear secured to said drive shaft assembly, an idler gear operatively connected to said first drive gear, a second drive gear being operatively connected to said idler gear, said second drive gear being rotatably driven by means secured to said hub portion.

2. Apparatus as defined in claim 1 wherein:
   said gears being located within a chamber, the confines of said chamber preventing accidental dislodgment of said gears.

3. Apparatus as defined in claim 2 including:
   a sleeve having a longitudinal opening therethrough, said sleeve being secured to said counter mechanism and extending through said central opening, said drive shaft assembly extending through said longitudinal opening, a plate connected to said sleeve and being adapted to abut said hub portion.

4. Apparatus as defined in claim 3 wherein:
   said first drive gear being located directly adjacent said plate, said idler gear and said second drive gear being rotably mounted upon said plate.

5. Apparatus as defined in claim 4 wherein:
   said means includes a cover being securable to said hub portion, a ring gear formed within said hub portion and being operatively connected to said second drive gear, said chamber being defined between said cover and said plate.

6. Apparatus as defined in claim 5 wherein:
   said drive shaft assembly being composed of a first drive shaft and a second drive shaft, said first drive shaft being connected to said counter mechanism, said second drive shaft being connected to said first drive gear.

7. Apparatus as defined in claim 6 wherein:
   said gears being capable of being selected to assume various sizes.

8. A measuring wheel device comprising:
   a measuring wheel having a rim portion and a hub portion, said rim portion being adapted to come into contact with a surface to be measured, said hub portion having a central opening therein;
   a counter mechanism being adapted to record the rotational movement of said wheel, said counter mechanism being operable by a drive shaft assembly, said counter mechanism located within a housing;
   said drive shaft assembly extending through said central opening; and
   a drive gear secured to said drive shaft assembly, a ring gear fixedly connected through a first means to said housing, said measuring wheel being rotatably mounted relative to said first means, a planetary gear in engagement with both said ring gear and said drive gear, said planetary gear mounted on a stub shaft, said stub shaft being rotationally mounted upon a second means which is fixed to said hub portion, said drive shaft assembly extends through and is rotatably mounted within said first means.

9. A device as defined in claim 8 wherein:
   said first means comprises a sleeve having a longitudinal opening therethrough, said sleeve extending through said central opening, a plate connected to said sleeve and being adapted to be located directly adjacent a portion of said hub portion;
   an annular collar formed upon said plate adjacent the periphery of said plate, said ring gear formed internally of said annular collar; and
   said second means comprises a cover adapted to enclose said ring gear and said planetary gear and said drive gear.

References Cited

UNITED STATES PATENTS

| 2,325,130 | 7/1943 | Harmon | 33—141 R |
| 2,817,906 | 12/1957 | Hall | 33—141 R |
| 2,878,566 | 3/1959 | Mellen | 33—141 R |

HARRY N. HAROIAN, Primary Examiner.